US012017417B2

(12) United States Patent
Chuang et al.

(10) Patent No.: US 12,017,417 B2
(45) Date of Patent: Jun. 25, 2024

(54) FIXTURE FOR HEAT PRESSING PROCESS OF MANUFACTURING AIRBAG

(71) Applicant: National Yang Ming Chiao Tung University, Hsinchu (TW)

(72) Inventors: Jen-Hui Chuang, Hsinchu (TW); June-Hao Hou, Hsinchu (TW); Chi-Li Cheng, Kaohsiung (TW); Han-Ting Lin, Taipei (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 185 days.

(21) Appl. No.: 17/592,093

(22) Filed: Feb. 3, 2022

(65) Prior Publication Data
US 2023/0141881 A1 May 11, 2023

(30) Foreign Application Priority Data
Nov. 11, 2021 (TW) ................. 110142042

(51) Int. Cl.
B29C 65/78 (2006.01)
B29C 59/02 (2006.01)
B29L 22/02 (2006.01)

(52) U.S. Cl.
CPC .......... *B29C 65/7841* (2013.01); *B29C 59/02* (2013.01); *B29L 2022/027* (2013.01)

(58) Field of Classification Search
CPC ... B29C 65/7841; B29C 51/262; B29C 59/02; B29C 65/18; B29C 66/003; Y10S 425/048; B29L 2022/027
See application file for complete search history.

(56) References Cited

U.S. PATENT DOCUMENTS 3,635,643 A * 1/1972 Reinhall .................. B27N 3/22
425/452
3,951,724 A * 4/1976 Johnson .............. B32B 37/1018
100/211
(Continued)

FOREIGN PATENT DOCUMENTS

CN        105479778 A      4/2016
CN        107280109 A     10/2017
(Continued)

OTHER PUBLICATIONS

Ou, Jifei et al., "aeroMorph—Heat-sealing Inflatable Shape-change Materials for Interaction Design," UIST '16: Proceedings of the 29th Annual Symposium on User Interface Software and Technology, Oct. 2016, pp. 121-132.
(Continued)

*Primary Examiner* — Jerzi H Moreno Hernandez
(74) *Attorney, Agent, or Firm* — MUNCY, GEISSLER, OLDS & LOWE, P.C.

(57) ABSTRACT

A fixture for heat pressing process is applied to a hot pressing machine for hot pressing two elastic plastic pieces so as to manufacture an airbag. The two elastic plastic pieces are disposed between the fixture and the hot pressing machine. The fixture includes a first frame, a second frame and a flexible heat blocking layer. The first frame includes two first brackets, which are separated from each other with a first distance. The second frame includes two second brackets, which are separated from each other with a second distance, and located at two ends of the first brackets, respectively. The flexible heat blocking layer is fixed by the first frame and/or the second frame.

18 Claims, 10 Drawing Sheets

(56) References Cited

U.S. PATENT DOCUMENTS

| | | | | |
|---|---|---|---|---|
| 2015/0217505 A1* | 8/2015 | Fischer | ............... | G03F 7/0017 |
| | | | | 264/293 |
| 2015/0217529 A1* | 8/2015 | Nagasaka | ........... | H01L 23/4006 |
| | | | | 100/211 |
| 2015/0343699 A1* | 12/2015 | Rayama | ............... | B29C 51/262 |
| | | | | 425/388 |
| 2022/0024080 A1* | 1/2022 | Lu | ........................ | G03F 7/0002 |
| 2022/0279946 A1* | 9/2022 | Sizemore | ................ | A47G 7/04 |

FOREIGN PATENT DOCUMENTS

| | | |
|---|---|---|
| CN | 111213959 A | 6/2020 |
| JP | 2017130678 A | 7/2017 |
| TW | M608192 U | 2/2021 |

OTHER PUBLICATIONS

Niiyama, Ryuma et al., "Sticky Actuator: Free-Form Planar Actuators for Animated Objects," TEI 2015—Proceedings of the 9th International Conference on Tangible, Embedded, and Embodied Interaction, DOI: 10.1145/2677199.2680600, Jun. 2015, 9 pages.

Mirski, Zbigniew et al., "Cutting components by laser for cushion airbags in functional aspect," Welding Technology Review, vol. 91(12), 2019, 7 pages.

* cited by examiner

FIXTURE FOR HEAT PRESSING PROCESS OF MANUFACTURING AIRBAG

CROSS REFERENCE TO RELATED APPLICATIONS

This Non-provisional application claims priority under 35 U.S.C. § 119(a) on Patent Application No(s). 110142042 filed in Taiwan, Republic of China on Nov. 11, 2021, the entire contents of which are hereby incorporated by reference.

BACKGROUND

Technology Field

The present disclosure relates to a fixture for heat pressing process and, in particular, to a fixture for heat pressing process that is applied to a hot pressing machine for hot pressing two elastic plastic pieces so as to manufacture a customized airbag.

Description of Related Art

The applications and requirements for airbags have increased in recent years. Airbags are mainly used in applications such as shoes, somatosensory devices, pneumatic devices, medical products contacting body, and the likes. However, most of the conventional heat pressing processes are unable to flatten and hot press plastic materials, and are mainly used for mass production of simple airbags. Therefore, the airbags are usually made by direct contact process or utilizing molds, so it is difficult to manufacture the customized airbags of various sizes and complex shapes.

One of the conventional mechanisms used in the heat pressing process utilizes a ball heating head. However, the lubricating oil must be added continuously during the process. Otherwise, the ball will get stuck after the lubricating oil has been evaporated by high temperature treatment, and the friction between the heating head and the subjected plastic piece will increase, which may cause the breaking of the plastic piece. Another mechanism used in the heat pressing process utilizes a laser cutting machine to sinter the plastic pieces, thereby causing different plastic pieces to be cemented. However, the applied laser may cause the warps of plastic pieces and generate toxic exhaust gas.

Therefore, it is desired to provide a fixture for heat pressing process that can be applied to a hot pressing mechanism without utilizing the conventional ball heat head or the conventional laser cutting machine, thereby preventing the breaking or warp of plastic pieces or the generation of toxic exhaust gas. Moreover, it is also desired to provide a fixture for heat pressing process that can be applied to manufacture the customized airbags of various sizes and complex shapes.

SUMMARY

This disclosure is to provide a fixture for heat pressing process that can be applied to various hot pressing mechanisms for manufacturing the customized airbags of various sizes and complex shapes, and preventing the breaking or warp of plastic pieces or the generation of toxic exhaust gas.

To achieve the above, a fixture for heat pressing process of this disclosure is applied to a hot pressing machine for hot pressing two elastic plastic pieces so as to manufacture an airbag, wherein the two elastic plastic pieces are disposed between the fixture and the hot pressing machine. The fixture comprises a first frame, a second frame, and a flexible heat blocking layer. The first frame comprises two first brackets, and the first brackets are separated from each other with a first distance. The second frame comprises two second brackets, and the second brackets are separated from each other with a second distance. The second brackets are located at two ends of the first brackets, respectively. The flexible heat blocking layer is fixed by the first frame and/or the second frame.

In one embodiment, each of the first brackets comprises a first groove, each of the second brackets comprises a second groove, the flexible heat blocking layer comprises at least one first through hole, and the at least one first through hole is arranged corresponding to the first grooves and/or the second grooves.

In one embodiment, the fixture further comprises at least one first screw and at least one first nut, and the at least one first screw passes through the first groove and the second groove, and is screwed to the at least one first nut.

In one embodiment, when the first through hole is disposed corresponding to the first groove and the second groove, the at least one first screw further passes through the first through hole, the first through hole is located between the first groove and the second groove, and the flexible heat blocking layer is located between the first frame and the second frame.

In one embodiment, the fixture further comprises at least one second screw and at least one second nut. When the first through hole is disposed corresponding to the first groove, the at least one second screw passes through the first groove and the first through hole and is screwed to the at least one second nut. Otherwise, when the first through hole is disposed corresponding to the second groove, the at least one second screw passes through the second groove and the first through hole and is screwed to the at least one second nut.

In one embodiment, the fixture further comprises two holding members. When the first through holes are disposed corresponding to the first grooves, the holding members are arranged on the second brackets, respectively. In another case, when the first through holes are disposed corresponding to the second grooves, the holding members are arranged on the first brackets, respectively. The holding members are configured to hold two opposite sides of the flexible heat blocking layer.

In one embodiment, the first brackets are arranged in parallel, and the second brackets are arranged in parallel.

In one embodiment, the second brackets are mirrored and symmetrically arranged at two ends of the first brackets with respect to a plane, which is perpendicular to the first brackets and passing through centers of the first brackets.

In one embodiment, the first frame further comprises two third brackets, the second frame further comprises two fourth brackets, the third brackets are disposed corresponding to the second brackets, and the fourth brackets are disposed corresponding to the first brackets. Two ends of the first brackets are fixed to two ends of the third brackets so as to form the first frame, two ends of the second brackets are fixed to two ends of the fourth brackets so as to form the second frame, and the first frame is fixed to the second frame.

In one embodiment, the first brackets and the third brackets of the first frame are integrally formed as one piece, and the second brackets and the fourth brackets of the second frame are integrally formed as one piece.

In one embodiment, the first frame further comprises at least one second through hole, the second frame further comprises at least one third through hole, the flexible heat blocking layer comprises at least one first through hole, and the at least one first through hole, the at least one second through hole and the at least one third through hole are disposed corresponding to each other.

In one embodiment, the fixture further comprises at least one first screw and at least one first nut, and the at least one first screw passes through the at least one second through hole, the at least one first through hole and the at least one third through hole, and is screwed to the at least one first nut.

In one embodiment, the first brackets and the second brackets together defines an opening, and a shape of the opening corresponds to a working surface of the hot pressing machine, so that the first frame or the second frame is directly fixed on the working surface through the opening.

In one embodiment, the flexible heat blocking layer is made of a cloth material, and the cloth material comprises Teflon and/or a glass fiber material.

In one embodiment, the fixture further comprises at least one fixing portion disposed on the first frame and/or the second frame, and the fixing portion is in contact with the hot pressing machine for fixing the fixture on the hot pressing machine.

In one embodiment, the at least one fixing portion comprises at least two protrusions, which are disposed at two opposite positions on the first brackets and/or the second brackets.

As mentioned above, the fixture for heat pressing process of this disclosure can be applied to various kinds of hot pressing mechanisms for manufacturing customized airbags of various sizes and complex shapes, and preventing the breaking or warp of plastic pieces or the generation of toxic exhaust gas. In addition, the fixture for heat pressing process of this disclosure has a simple structure, so that it can be quickly assembled and adjusted, and is suitable for the working surfaces of various kinds of hot pressing mechanisms.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

To be noted, this disclosure provides multiple embodiments, and each of the embodiments represents a combination of the elements disclosed in the present invention under a certain possible circumstance. However, the present invention should still include all possible combinations of the disclosed elements. Therefore, if one embodiment includes elements A, B, and C, and the second embodiment includes elements B and D, even if it is not explicitly disclosed, the present invention should be understood to include any of the combinations of A, B, C, and/or D.

Figure 1A:
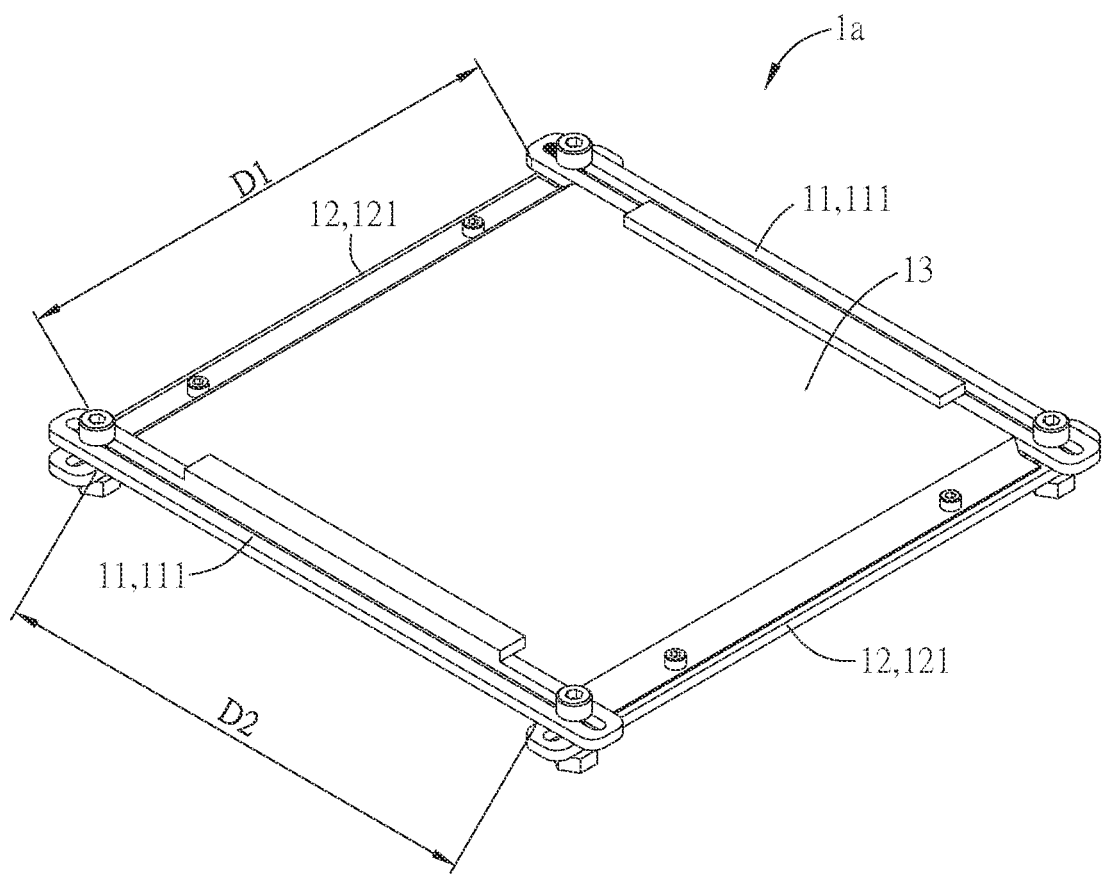
FIG. 1A is a schematic diagram showing a fixture for heat pressing process according to a first embodiment of this disclosure.
Figure 1B:
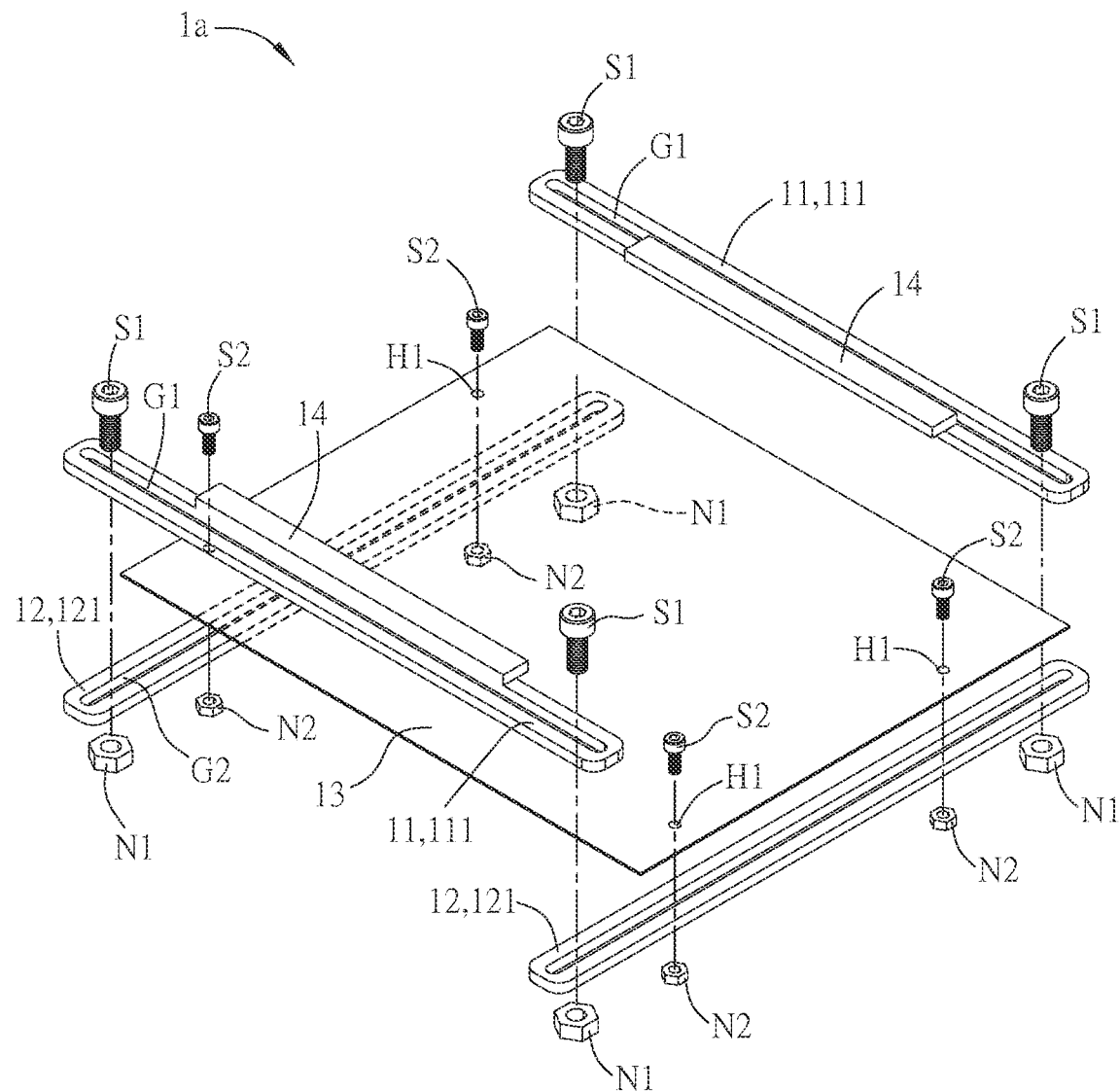
FIG. 1B is an exploded view of the fixture as shown in FIG. 1A.
Figure 4:
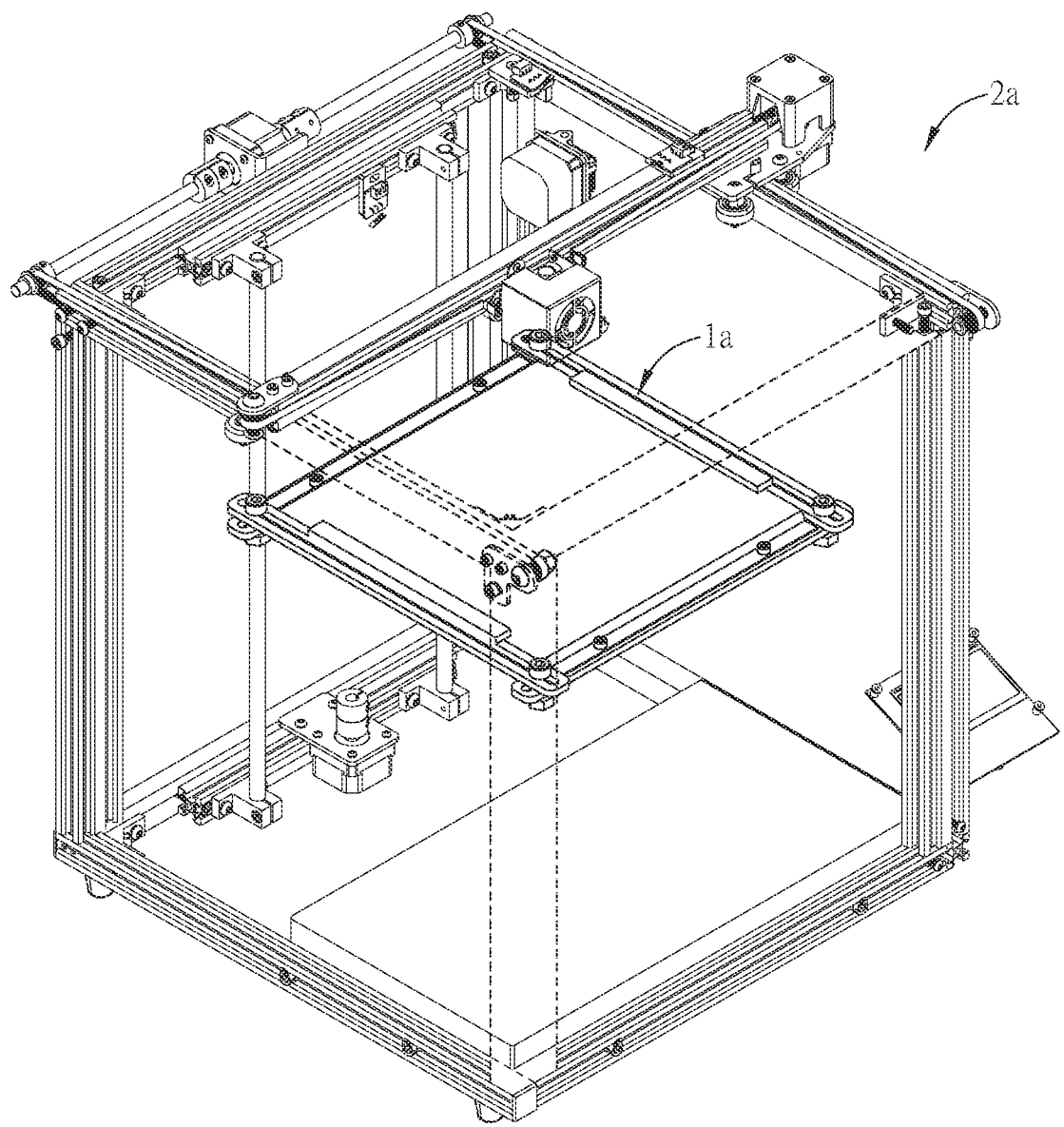
FIG. 4 is a schematic diagram showing the fixture of the first embodiment applied to a hot pressing machine.
Figure 5:
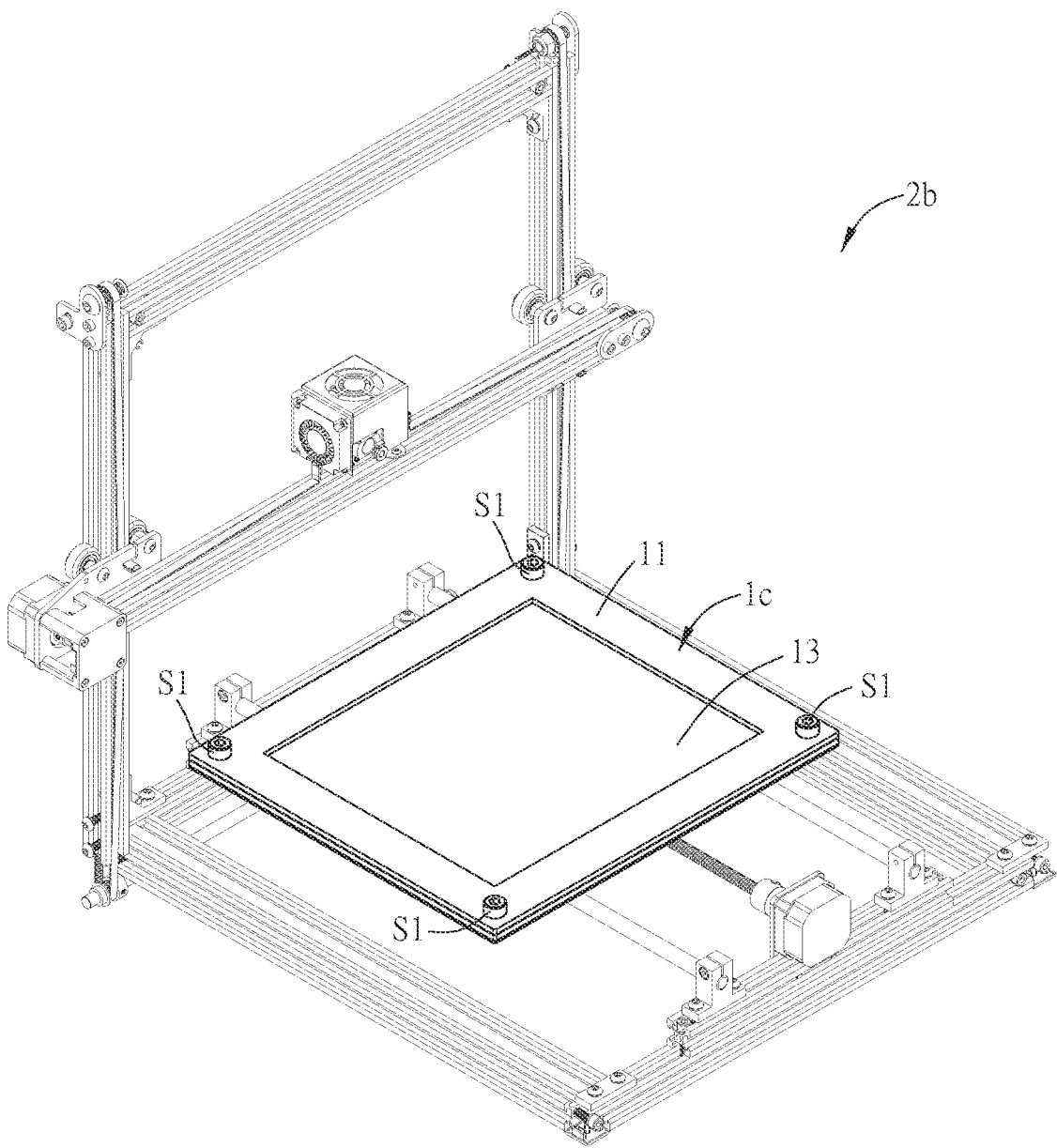
FIG. 5 is a schematic diagram showing the fixture of the third embodiment applied to a hot pressing machine.
Figure 6A:
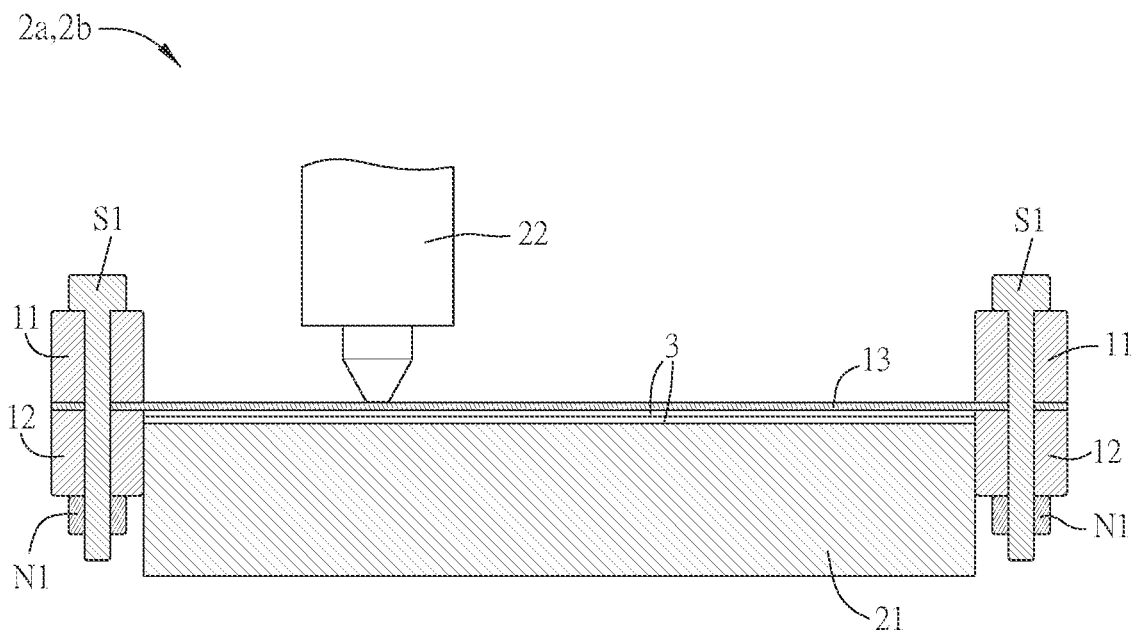
FIG. 6A is a sectional view of the fixture and the hot pressing head of the hot pressing machine as shown in FIG. 4 or 5, wherein the hot pressing head is applied to perform a heat pressing process.

FIG. 1A is a schematic diagram showing a fixture for heat pressing process according to a first embodiment of this disclosure, FIG. 1B is an exploded view of the fixture as shown in FIG. 1A, FIG. 4 is a schematic diagram showing the fixture of the first embodiment applied to a hot pressing machine, and FIG. 6A is a sectional view of the fixture and the hot pressing head of the hot pressing machine as shown in FIG. 4 or 5, wherein the hot pressing head is applied to perform a heat pressing process. Referring to FIGS. 1A, 1B, 4 and 6A, in this embodiment, the fixture 1a for heat pressing process is applied to a hot pressing machine 2a for hot pressing two elastic plastic pieces 3. The two elastic plastic pieces 3 are disposed between the fixture 1a and the hot pressing machine 2a. The hot pressing machine 2a includes a working surface 21 and a hot pressing head 22. The two elastic plastic pieces 3 (two layers) are disposed on the working surface 21 of the hot pressing machine 2a, and then the fixture 1a is placed on the elastic plastic pieces 3, followed by a heat pressing process. The hot pressing machine can be, for example but not limited to, a 3D printer, a CNC machine, or any of other mechanisms known to those with ordinary knowledge in the art that can be used to directly heat the elastic plastic pieces 3 with a hot pressing head so as to manufacture an airbag.

In this embodiment, the fixture 1a includes a first frame 11, a second frame 12, and a flexible heat blocking layer 13. The first frame 11 comprises two first brackets 111, and the first brackets 111 are separated from each other with a first distance D1. The second frame 12 comprises two second brackets 121, and the second brackets 121 are separated from each other with a second distance D2. The second brackets 121 are located at two ends of the first brackets 111, respectively. The flexible heat blocking layer 13 is fixed by the first frame 11 and/or the second frame 12. This method and operation for fixing the flexible heat blocking layer 13 by the first frame 11 and/or the second frame 12 will be described in detail hereinafter.

In this embodiment, each of the two first brackets 111 comprises a first groove G1, each of the two second brackets 121 comprises a second groove G2, the flexible heat blocking layer 13 comprises at least one first through hole H1, and the first through hole H1 is arranged corresponding to the first grooves G1 and/or the second grooves G2. Particularly, in this embodiment, the flexible heat blocking layer 13 includes four first through hole H1, wherein two first through hole H1 are arranged corresponding to one of the second grooves G2, and the other two first through hole H1 are arranged corresponding to the other one of the second grooves G2. To be noted, the above arrangement is for an illustration only, and is not to limit this disclosure. In other embodiments, the first through holes H1 can be arranged corresponding to the first grooves G1, or be arranged corresponding to both of the first grooves G1 and the second grooves G2. Besides, the amount of the first through holes H1 can be changed based on the requirement of users, and this disclosure is not limited thereto.

In this embodiment, the fixture 1a further comprises at least one first screw S1 and at least one first nut N1. The first screw S1 passes through the first groove G1 and the second groove G2, and is screwed to the first nut N1. Particularly, the fixture 1a of this embodiment includes four first screws S1 and four corresponding first nuts N1. To be noted, the amounts of the first screws S1 and the first nuts N1 can be changed based on the requirement of users as long as the first brackets 111 and the second brackets 121 can be firmly fixed. This disclosure is not limited thereto.

In this embodiment, when the first through holes H1 only correspond to the first grooves G1 or the second grooves G2, the fixture 1a further comprises at least one second screw S2 and at least one second nut N2. When the first through holes H1 are disposed corresponding to the first grooves G1, each of the second screws S2 passes through the corresponding first groove G1 and the corresponding first through hole H1, and is screwed to the corresponding one of the second nuts N2. Otherwise, when the first through hole H1 is disposed corresponding to the second groove G2, each of the second screws S2 passes through the corresponding second groove G2 and the corresponding first through hole H1, and is screwed to the corresponding one of the second nuts N2. Particularly, the fixture 1a of this embodiment includes four second screws S2 and four corresponding second nuts N2, and two opposite sides of the flexible heat blocking layer 13 corresponding to the second brackets 121 are fixed to the two brackets 121, respectively, by the second screws S2 and the second nuts N2. To be noted, the amounts of the second screws S2 and the second nuts N2 can be changed based on the requirement of users. In other embodiments, the flexible heat blocking layer 13 can be fixed to the first brackets 111. Any configuration is acceptable as long as the amounts of the second screws S2 and the second nuts N2 match the amount of the first through holes H1, and the flexible heat blocking layer 13 can be firmly fixed on the first brackets 111 and/or the second brackets 121. This disclosure is not limited thereto.

In this embodiment, the fixture 1a further comprises two holding members 14. When the first through holes H1 are disposed corresponding to the first grooves G1, the holding members 14 are arranged on the second brackets 121, respectively. In another case, when the first through holes H1 are disposed corresponding to the second grooves G2, the holding members 14 are arranged on the first brackets 111, respectively. The holding members 14 are configured to hold two opposite sides of the flexible heat blocking layer 13. Herein, the holding members 14 are, for example, disposed on the first brackets 111. The two holding members 14 are arranged on the two first brackets 111, respectively, and each holding member 14 is arranged adjacent to the first groove G1 of the corresponding first bracket 111 and extends toward the direction away from the first groove G1 (or toward the other holding member 14). Accordingly, the two holding members 14 are located opposite to each other and are configured to hold and fix the opposite sides of the flexible heat blocking layer 13. In this case, two opposite sides of the flexible heat blocking layer 13, which are configured with the first through holes H1, are fixed to the second brackets 121, and the other two opposite sides thereof are held and fixed by the holding members 14 on the first brackets 111. Of course, in other embodiments, two opposite sides of the flexible heat blocking layer 13, which are configured with the first through holes H1, can be fixed to the first brackets 111, and the other two opposite sides thereof can be held and fixed by the holding members 14 on the second brackets 121.

Figure 1C:
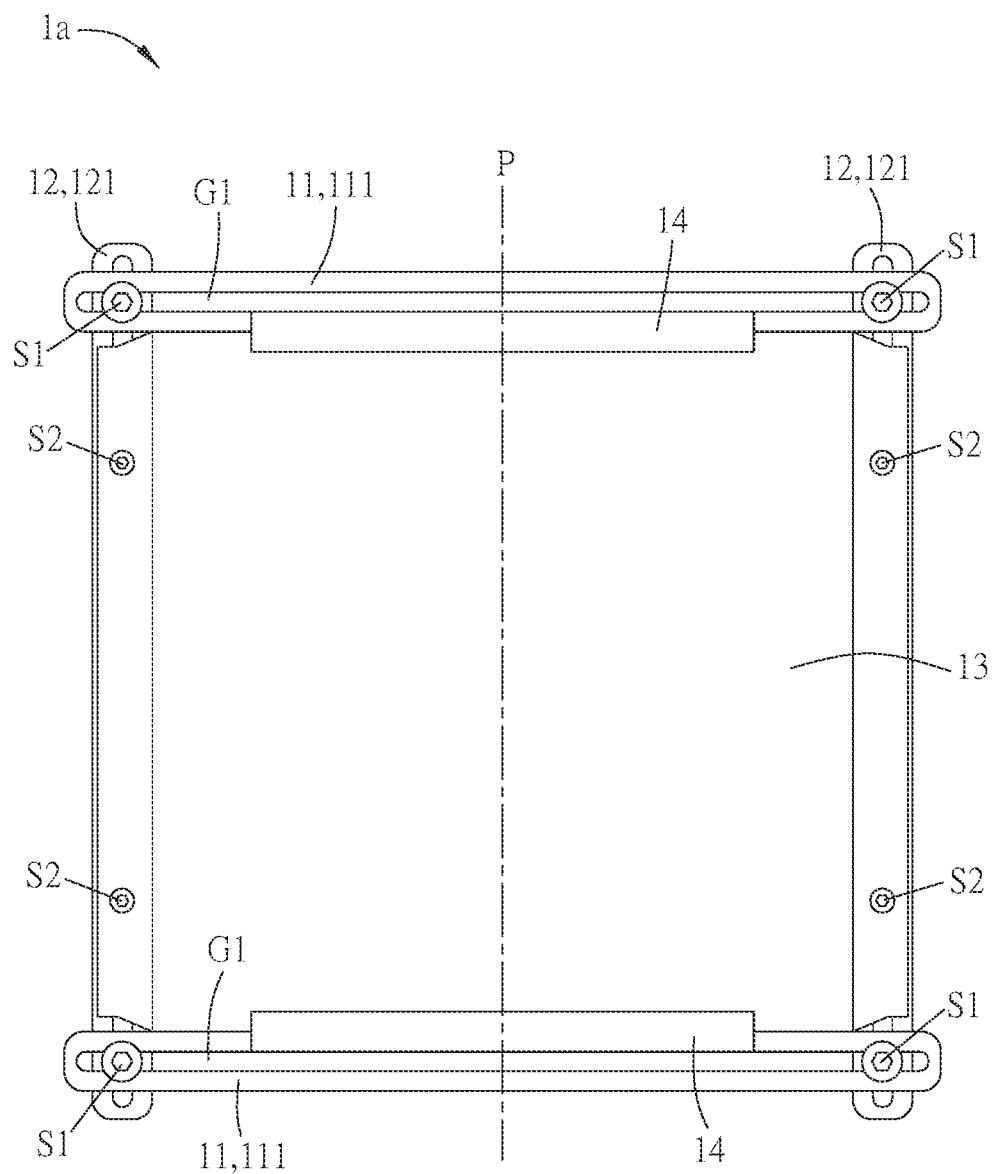
FIG. 1C is a top view of the fixture of FIG. 1A.

FIG. 1C is a top view of the fixture 1a of FIG. 1A. Referring to FIG. 1C, in this embodiment, the first brackets 111 are arranged in parallel, and the second brackets 121 are arranged in parallel. Specifically, the second brackets 121 are mirrored and symmetrically arranged at two ends of the first brackets 111 with respect to a plane P, which is perpendicular to the first brackets 111 and passing through centers of the first brackets 111. In this aspect, the first brackets 111 are arranged in parallel, the second brackets 121 are arranged in parallel, and the first brackets 111 are perpendicular to the second brackets 121, thereby forming the rectangular or square fixture 1a. In another aspect, the first brackets 111 can be not parallel to each other, the second brackets 121 can be not parallel to each other, and the first brackets 111 can be not perpendicular to the second brackets 121. For example, the first brackets 111 and the second brackets 121 can be assembled to form a rhombus shape, a trapezoid shape, or any of other conventional quadrilateral shapes, as long as the fixture 1a can correspond to the working surface of the hot pressing machine and fix to the hot pressing machine. This disclosure is not limited thereto.

Figure 1D:
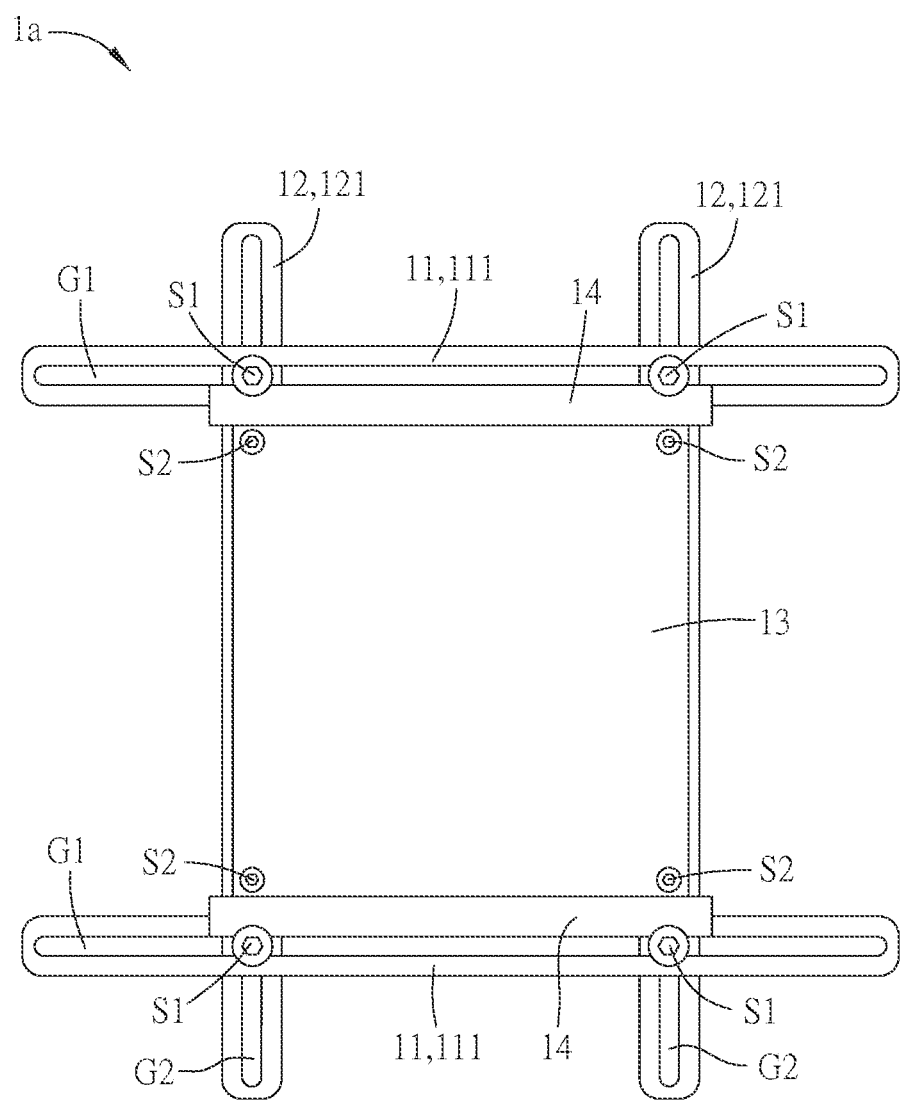
FIG. 1D is a schematic diagram showing a transform aspect of the fixture of FIG. 1A, wherein the relative positions of the first brackets and the second brackets are changed from FIG. 1C.

FIG. 1D is a schematic diagram showing a transform aspect of the fixture 1a of FIG. 1A, wherein the relative positions of the first brackets 111 and the second brackets 121 are changed from FIG. 1C. Referring to FIG. 1C in view of FIG. 1D, the difference between FIG. 1C and FIG. 1D is the fixing positions of the first screws S1 and the first nuts N1. As shown in FIG. 1C, each first screw S1 and the corresponding first nut N1 are screwed at the cross position of one end of one first groove G1 and one end of the corresponding second groove G2. As shown in FIG. 1D, each first screw S1 and the corresponding first nut N1 are screwed at the cross position of one first groove G1 and the corresponding second groove G2 (other than the ends of the first groove G1 and the second groove G2). The fixing positions of the first screws S1 and the first nuts N1 with respect to the cross positions of the first grooves G1 and the second grooves G2 can be adjusted to match the working surface of the heat pressing machine. If the working surface is smaller, the fixing positions can be away from the ends of the first grooves G1 and the second grooves G2. Otherwise, if the working surface is larger, the fixing positions can be close to the ends of the first grooves G1 and the second grooves G2. Accordingly, the fixture 1a can be applied to various hot pressing machines with the working surfaces of different sizes.

Figure 2:
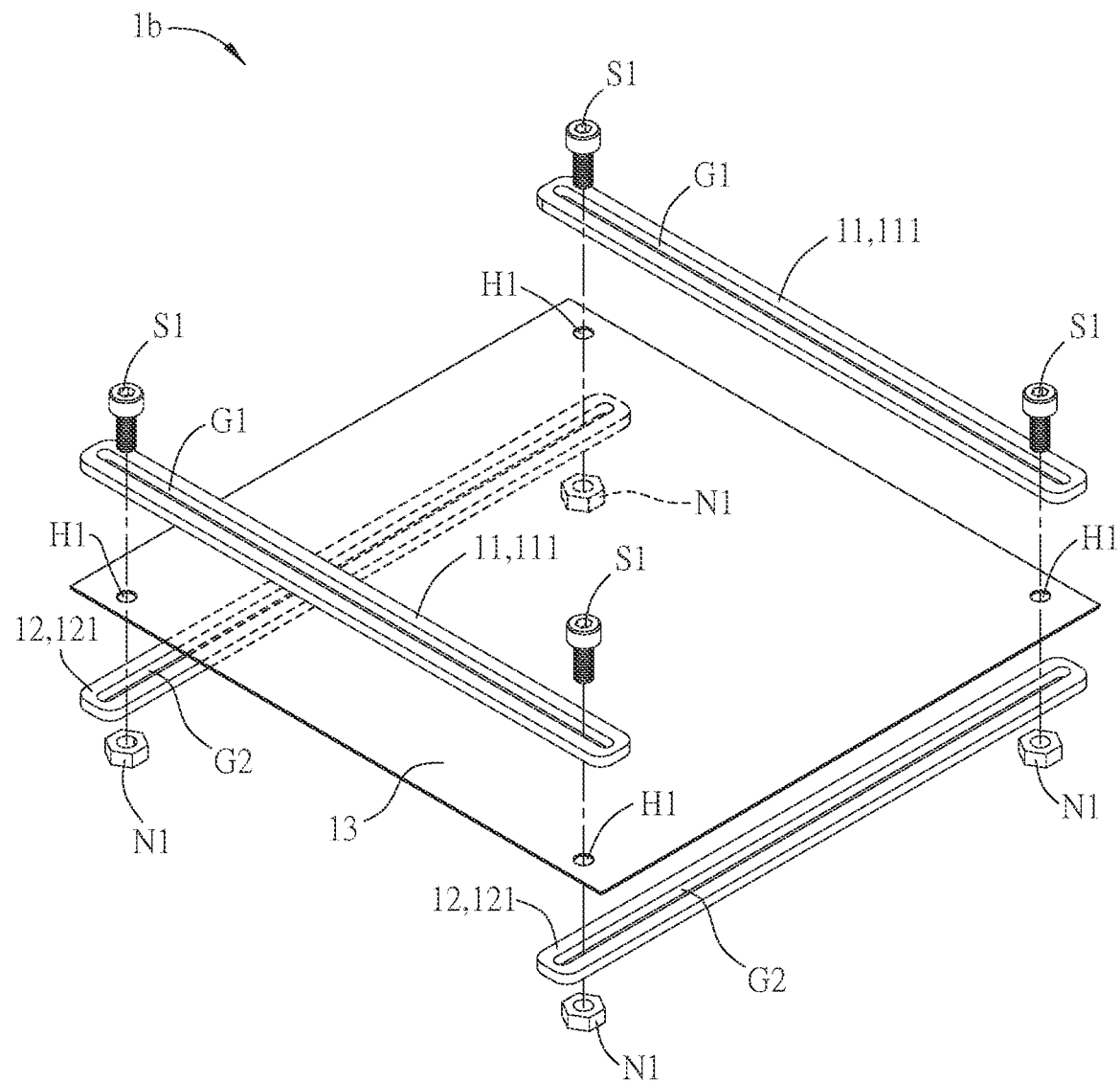
FIG. 2 is an exploded view of the fixture for heat pressing process according to a second embodiment of this disclosure.

FIG. 2 is an exploded view of the fixture 1b for heat pressing process according to a second embodiment of this disclosure. The fixture 1b of this embodiment is similar to the fixture 1a of the first embodiment, and the difference therebetween is the positions of the first through holes H1. Referring to FIG. 2, in the second embodiment, each of the first through holes H1 of the flexible heat blocking layer 13 of the fixture 1b is arranged corresponding to one corresponding first groove G1 and one corresponding second groove G2. Accordingly, each first screw S1 can pass through the corresponding first through hole H1, and each through hole H1 is located between the corresponding first groove G1 and the corresponding second groove G2, so that the flexible heat blocking layer 13 can be arranged between the first frame 11 and the second frame 12.

Figure 3A:
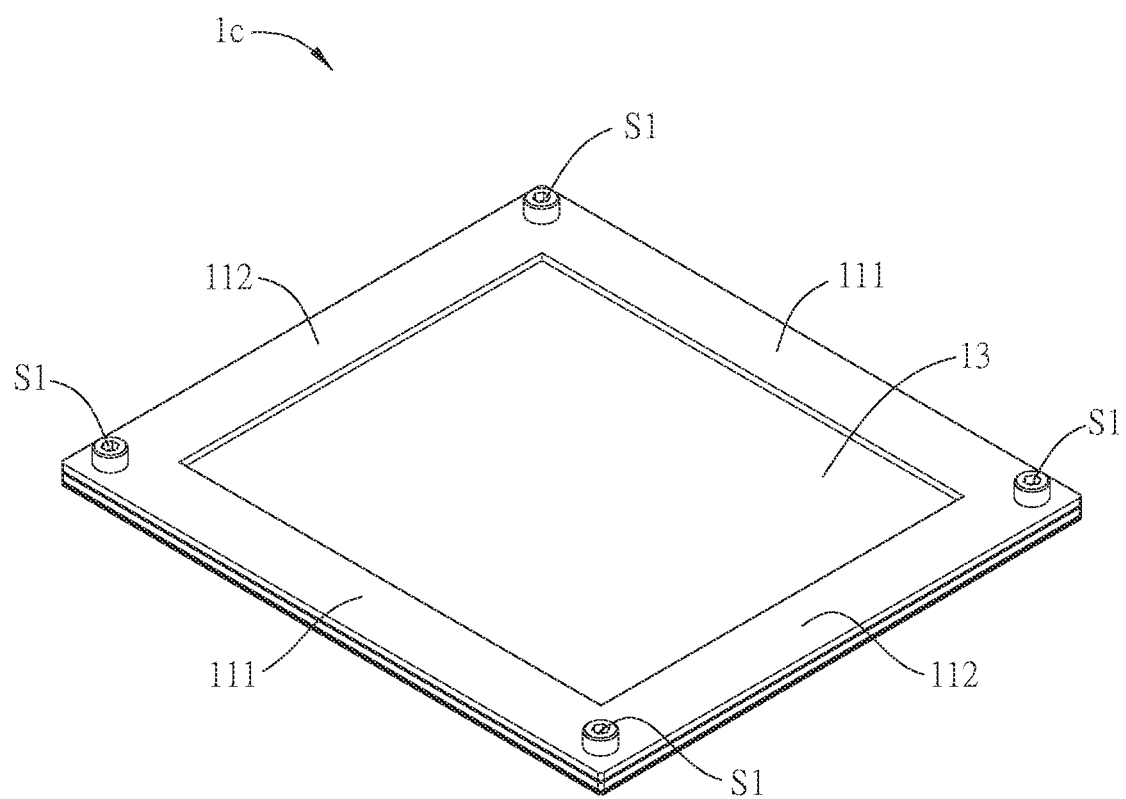
FIG. 3A is a schematic diagram showing a fixture for heat pressing process according to a third embodiment of this disclosure.
Figure 3B:
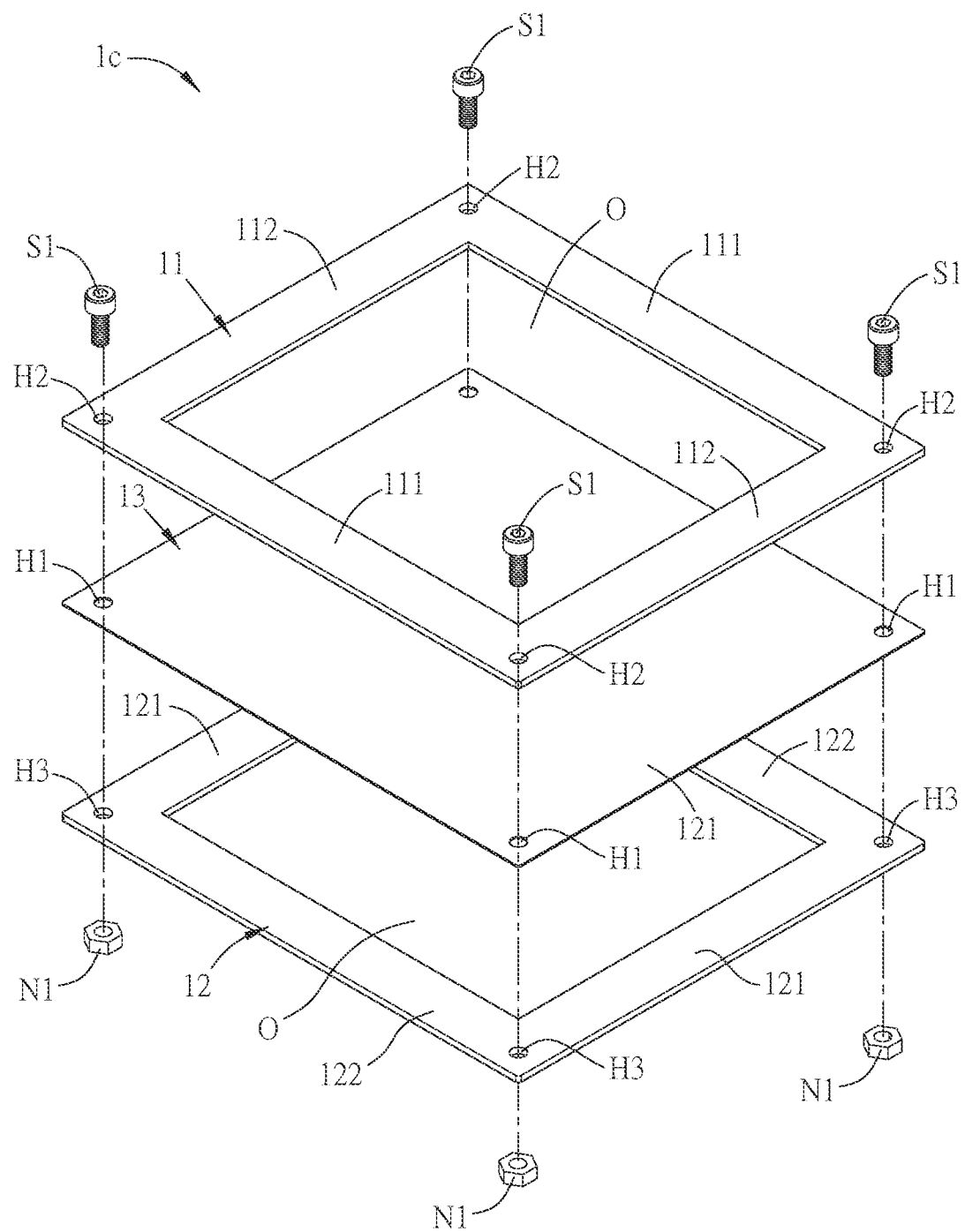
FIG. 3B is an exploded view of the fixture as shown in FIG. 3A.

FIG. 3A is a schematic diagram showing a fixture 1c for heat pressing process according to a third embodiment of this disclosure, and FIG. 3B is an exploded view of the fixture 1c as shown in FIG. 3A. The fixture 1c of the third embodiment is similar to the fixture 1b of the second embodiment. Unlike the second embodiment, the first frame 11 of the fixture 1c further comprises two third brackets 112, and the second frame 12 of the fixture 1c further comprises two fourth brackets 122. The third brackets 112 are disposed corresponding to the second brackets 121, and the fourth brackets 122 are disposed corresponding to the first brackets 111. Two ends of the first brackets 111 are fixed to two ends of the third brackets 112 so as to form the first frame 11, and two ends of the second brackets 121 are fixed to two ends of the fourth brackets 122 so as to form the second frame 12. The first frame 11 is fixed to the second frame 12. Herein, the first brackets 111 and the third brackets 112 can be fixed to each other by screwing, engaging or hooking, or any of other conventional methods known to those with ordinary knowledge in the art. The fixing methods of the first frame 11 and the second frame 12 will be described in detail hereinafter.

In this embodiment, the first brackets 111 and the third brackets 112 of the first frame 11 are integrally formed as one piece, and the second brackets 121 and the fourth brackets 122 of the second frame 12 are integrally formed as one piece. Particularly, the first brackets 111 are perpendicular to the third brackets 112, and the second brackets 121 are perpendicular to the fourth brackets 122, so that the first frame 11 and the second frame 12 can be formed in a rectangular shape or a square shape. In other aspects, the first brackets 111 can be not parallel to the third brackets 112, and the second brackets 121 can be not parallel to the fourth brackets 122. For example, the first brackets 111 and the third brackets 112 can be assembled to form a rhombus shape, or any of other conventional quadrilateral shapes, and the second brackets 121 and the fourth brackets 122 can be assembled to form a rhombus shape, or any of other conventional quadrilateral shapes, as long as the fixture 1c can correspond to the working surface of the hot pressing machine and fix to the hot pressing machine. This disclosure is not limited thereto.

In this embodiment, the first frame 11 further comprises at least one second through hole H2, the second frame 12 further comprises at least one third through hole H3, the flexible heat blocking layer 13 comprises at least one first through hole H1, and the at least one first through hole H1, the at least one second through hole H2 and the at least one third through hole H3 are disposed corresponding to each other. Particularly, the fixture 1c includes four second through holes H2, four first through holes H1, and four third through holes H3, which are disposed corresponding to each other. In other embodiments, the amounts of the first through holes H1, the second through holes H2 and the third through holes H3 can be changed based on the requirement of users as long as the amounts thereof are equal.

In this embodiment, the fixture 1c further comprises at least one first screw S1 and at least one first nut N1, and the first screw S1 passes through the second through hole H2, the first through hole H1, and the third through hole H3, and is screwed to the first nut N1. Particularly, the fixture 1c includes four first screws S1 and four first nuts N1, which fix the first frame 11 and the second frame 12 through the four second through holes H2, the four first through holes H1, and the four third through holes H3. In other embodiments, the amounts of the first through holes H1, the second through holes H2, the third through holes H3, the first screws S1 and the first nuts N1 can be changed based on the requirement of users as long as the amounts thereof are equal and the flexible heat blocking layer 13 can be firmly fixed between the first frame 11 and the second frame 12.

Referring to FIGS. 1A and 3B in view of FIGS. 4, 5 and 6A, in the above-mentioned embodiments, the first brackets 111 and the second brackets 121 of each of the fixtures 1a, 1b and 1c can together define an opening O. The shape of the opening O corresponds to the working surface 21 of the hot pressing machine 2a or 2b, so that the first frame 11 or the second frame 12 is directly fixed on the working surface 21 of the hot pressing machine 2a or 2b through the opening O. As shown in FIG. 1A, the opening O can be defined by the first distance D1 and the second distance D2. As shown in FIG. 3B, the opening O can be defined in the first frame 11 and the second frame 12. Particularly, the shape of the opening O in the above embodiments is a square or a rectangle. In other embodiments, the opening can be a rhombus or any of other quadrilaterals, as long as the opening can correspond to the working surface 21 of the hot pressing machine 2a or 2b. This disclosure is not limited thereto.

Referring to FIGS. 4, 5 and 6A, the flexible heat blocking layer 13 is made of a cloth material, and the cloth material comprises Teflon and/or a glass fiber material, or any of other conventional heat blocking materials that are heat-resistant, scratch-resistant, and having low friction. In detail, the first frame 11 and/or the second frame 12 are configured to tension and fix the flexible heat blocking layer 13. During the heat pressing process, when the hot pressing head 22 moves on the flexible heat blocking layer 13, the flexible heat blocking layer 13 is not relatively moved with respect to the hot pressing head 22. Therefore, the flexible heat blocking layer 13 can be prevented from being wrinkled during the heat pressing process, and the lifetime of the flexible heat blocking layer 13 can be increased. This configuration can avoid the bad shape of the manufactured airbag and the poor hot pressing effect. In addition, the configuration of the flexible heat blocking layer 13 can prevent the hot pressing head 22 from directly contacting the elastic plastic piece 3, wherein the direct contacting between the hot pressing head 22 and the elastic plastic piece 3 may cause the overheating of the elastic plastic piece 3 so as to scratch or warp the elastic plastic piece 3, thereby leading to the poor quality of the manufactured airbag.

Figure 6B:
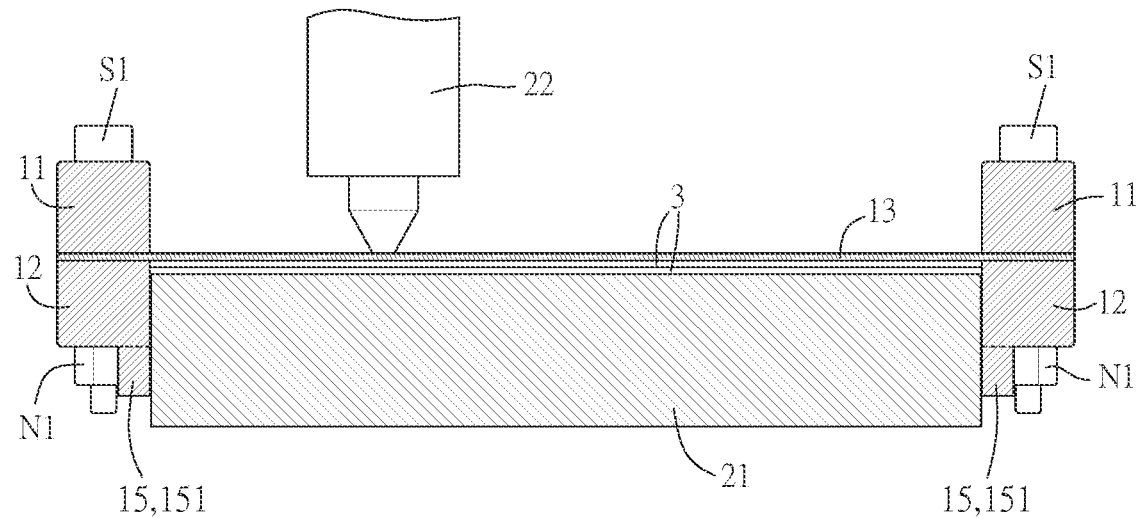
FIG. 6B is a sectional view of a fixture and a hot pressing head of a hot pressing machine according to another embodiment of this disclosure, wherein the hot pressing head is applied to perform a heat pressing process.

FIG. 6B is a sectional view of a fixture and a hot pressing head of a hot pressing machine according to another embodiment of this disclosure. In this embodiment, any of the fixtures 1a, 1b and 1c further includes at least one fixing portion 15, which is disposed on the first frame 11 and/or the second frame 12. The fixing portion 15 is in contact with the hot pressing machine 2a or 2b for fixing the fixture 1a, 1b or 1c on the hot pressing machine 2a or 2b. The at least one fixing portion 15 can comprise at least two protrusions 151, which are disposed at two opposite positions on the first brackets 111 and/or the second brackets 121. As shown in FIG. 6B, two protrusions 151 are disposed on, for example, two opposite sides of the second frame 12. To be noted, the amounts and positions of the protrusions 151 can be changed based on the requirement of users as long as the fixture 1a, 1b or 1c can be firmly fixed on the working surface 21 of the hot pressing machine 2a or 2b.

In summary, the fixture for heat pressing process of this disclosure can be applied to various kinds of hot pressing mechanisms for manufacturing customized airbags of various sizes and shapes, and preventing the breaking or warp of plastic pieces or the generation of toxic exhaust gas. In addition, the fixture for heat pressing process of this disclosure has a simple structure, so that it can be quickly assembled and adjusted, and is suitable for the working surfaces of various kinds of hot pressing mechanisms.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A fixture for a heat pressing process, which is applied to a hot pressing machine for hot pressing two elastic plastic pieces so as to manufacture an airbag, wherein the two elastic plastic pieces are disposed between the fixture and the hot pressing machine, the fixture comprising:
   a first frame comprising two first brackets, wherein the first brackets are separated from each other with a first distance, each of the first brackets comprises a first groove;
   a second frame comprising two second brackets, wherein the second brackets are separated from each other with a second distance, and located at two ends of the first brackets, respectively, each of the second brackets comprises a second groove;
   a flexible heat blocking layer fixed by the first frame and/or the second frame, wherein the flexible heat blocking layer comprises a plurality of first through holes; and
   two holding members;
   wherein when the plurality of first through holes are disposed corresponding to the first grooves of the first brackets, the holding members are arranged on the second brackets, respectively; or when the plurality of first through holes are disposed corresponding to the second grooves of the second brackets, the holding members are arranged on the first brackets, respectively; wherein the holding members are configured to hold two opposite sides of the flexible heat blocking layer.

2. The fixture of claim 1, further comprising at least one first screw and at least one first nut, and the at least one first screw passes through the first groove of one of the first brackets and the second groove of one of the second brackets, and is screwed to the at least one first nut.

3. The fixture of claim 2, wherein when one of the plurality of first through holes is disposed corresponding to both of the first groove of the one of the first brackets and the second groove of the one of the second brackets, the at least one first screw further passes through the one of the plurality of first through holes, the one of the plurality of first through holes is located between the first groove of the one of the first brackets and the second groove of the one of the second brackets, and the flexible heat blocking layer is located between the first frame and the second frame.

4. The fixture of claim 2, further comprising at least one second screw and at least one second nut, wherein when the plurality of first through holes are disposed corresponding to the first groove of the one of the first brackets, the at least one second screw passes through the first groove of the one of the first brackets and one of the plurality of first through holes and is screwed to the at least one second nut; or when the plurality of first through holes are disposed corresponding to the second groove of the one of the second brackets, the at least one second screw passes through the second groove of the one of the second brackets and one of the plurality of first through holes and is screwed to the at least one second nut.

5. The fixture of claim 1, wherein the first brackets are arranged in parallel, and the second brackets are arranged in parallel.

6. The fixture of claim 5, wherein the second brackets are mirrored and symmetrically arranged at two ends of the first brackets with respect to a plane, which is perpendicular to the first brackets and passes through centers of the first brackets.

7. The fixture of claim 6, wherein the first frame further comprises two third brackets, the second frame further comprises two fourth brackets, the third brackets are disposed corresponding to the second brackets, the fourth brackets are disposed corresponding to the first brackets, two ends of the first brackets are fixed to two ends of the third brackets so as to form the first frame, two ends of the second brackets are fixed to two ends of the fourth brackets so as to form the second frame, and the first frame is fixed to the second frame.

8. The fixture of claim 7, wherein the first brackets and the third brackets of the first frame are integrally formed as one piece, and the second brackets and the fourth brackets of the second frame are integrally formed as one piece.

9. The fixture of claim 8, wherein the first frame further comprises a plurality of second through holes, the second frame further comprises a plurality of third through holes, and the plurality of first through holes, the plurality of second through holes and the plurality of third through holes are disposed corresponding to each other, respectively.

10. The fixture of claim 9, further comprising at least one first screw and at least one first nut, and the at least one first screw passes through one of the plurality of second through holes, the plurality of first through holes and the plurality of third through holes, and is screwed to the at least one first nut.

11. The fixture of claim 1, wherein the first frame further comprises two third brackets, the second frame further comprises two fourth brackets, the third brackets are disposed corresponding to the second brackets, the fourth brackets are disposed corresponding to the first brackets, two ends of the first brackets are fixed to two ends of the third brackets so as to form the first frame, two ends of the second brackets are fixed to two ends of the fourth brackets so as to form the second frame, and the first frame is fixed to the second frame.

12. The fixture of claim 11, wherein the first brackets and the third brackets of the first frame are integrally formed as one piece, and the second brackets and the fourth brackets of the second frame are integrally formed as one piece.

13. The fixture of claim 12, wherein the first frame further comprises a plurality of second through holes, the second frame further comprises a plurality of third through holes, and the plurality of first through holes, the plurality of second through holes and the plurality of third through holes are disposed corresponding to each other, respectively.

14. The fixture of claim 13, further comprising at least one first screw and at least one first nut, and the at least one first screw passes through one of the plurality of second through holes, one of the plurality of first through holes and one of the plurality of third through holes, and is screwed to the at least one first nut.

15. The fixture of claim 1, wherein the first brackets and the second brackets together define an opening, and a shape of the opening corresponds to a working surface of the hot pressing machine, so that the first frame or the second frame is directly fixed on the working surface through the opening.

16. The fixture of claim 1, wherein the flexible heat blocking layer is made of a cloth material, and the cloth material comprises polytetrafluoroethylene and/or a glass fiber material.

17. The fixture of claim 1, further comprising at least one fixing portion disposed on the first frame and/or the second frame, wherein the at least one fixing portion is in contact with the hot pressing machine for fixing the fixture on the hot pressing machine.

18. The fixture of claim 17, wherein the at least one fixing portion comprises at least two protrusions, which are disposed at two opposite positions on the first brackets and/or the second brackets.

\* \* \* \* \*